Aug. 27, 1946.     C. E. LUCKE     2,406,552
AXIAL FLOW COOLING STRUCTURE FOR AIRCRAFT ENGINES
Filed Aug. 28, 1943
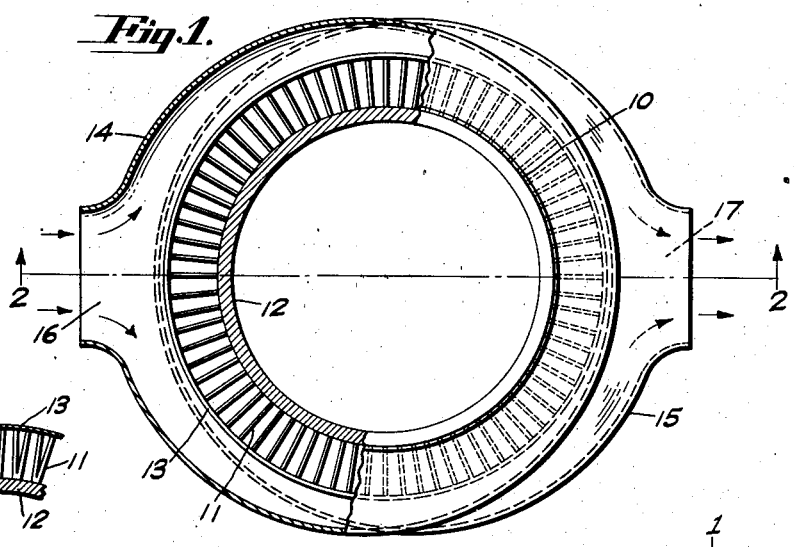
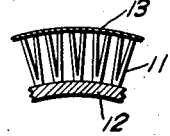
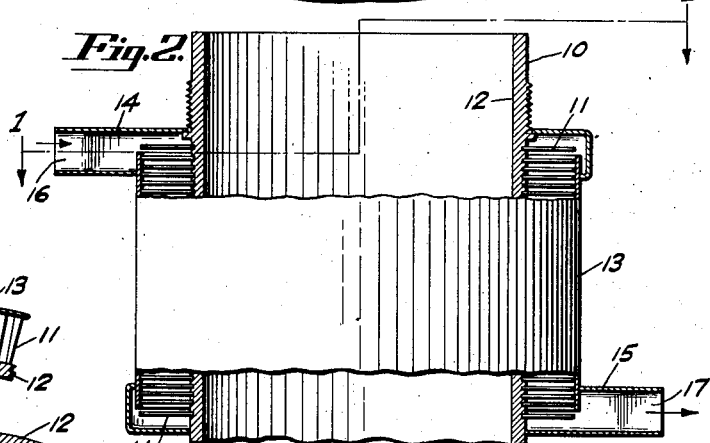
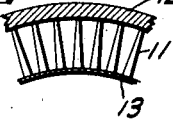
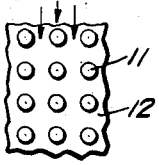
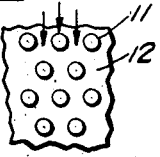
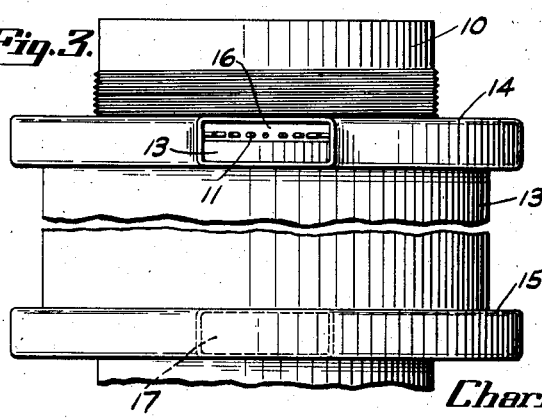
INVENTOR
Charles E. Lucke.
BY
Charles L. Shelton
ATTORNEY Patented Aug. 27, 1946

2,406,552

UNITED STATES PATENT OFFICE 2,406,552

AXIAL FLOW COOLING STRUCTURE FOR AIRCRAFT ENGINES

Charles E. Lucke, New York, N. Y., assignor to United Aircraft Corporation, East Hartford, Conn., a corporation of Delaware Application August 28, 1943, Serial No. 500,335

6 Claims. (Cl. 123—171)

This invention relates to cooling systems for internal combustion engines and more particularly to means for uniformly and effectively air cooling the cylinder walls of aircraft engines.

A primary object of the invention is to provide means to cool the walls of an engine cylinder and associated parts so that the temperature of the walls will be maintained substantially equal circumferentially of the cylinder during operation of the engine.

A feature of the invention that is important is that a large number of closely spaced and uniformly distributed elongated heat conducting members in the form of spines are provided outstanding generally radially from the different portions of the cylinder wall, there being guiding means for uniformly distributing the cooling air circumferentially of the cylinder and about the spines.

Another feature of the invention that is advantageous is that a cylindrical enclosing jacket is provided preferably comprising a thin sheet of high heat conducting metal surrounding the cylinder and supported in heat conducting contact with the spines at their outer ends.

Another object of the invention is to provide means to guide the circumferentially distributed cooling air in a direction axially of the cylinder within the interspine space from one end of the jacket to the other, these means also effecting and maintaining uniform distribution of the air circumferentially of the cylinder within the jacketed space.

A still further object is to provide chambers surrounding the cylinder and enclosing the opposite ends of the jacket, there being a side opening for each of these chambers to admit and exhaust the cooling fluid respectively to and from the space within the jacket; the chambers preferably being of decreasing area in cross section from their openings to the side diametrically opposite thereto so that the cooling fluid will be uniformly distributed circumferentially of the cylinder and withdrawn therefrom after passing axially of the cylinder through the jacketed space.

Other objects and advantages will be apparent from the specification and claims, and from the drawing which illustrates what is now considered to be a preferred embodiment of the invention.

In the drawing,

Fig. 1 is a plan view of a cylinder provided with one embodiment of the present invention, some of the parts being shown in section to more clearly disclose their construction, the section being taken on the plane of line 1—1 in Fig. 2.

Fig. 2 is a longitudinal view of the cylinder shown in Fig. 1, partly in section, the section being taken on the plane of line 2—2 in Fig. 1.

Fig. 3 is a longitudinal view of the cylinder shown in Figs. 1 and 2, taken from the left side of Fig. 1.

Figs. 4 and 5 show selected detail arrangements for the cooling spines on the surface of the cylinder which are now thought desirable, and Fig. 6, 7 and 8 show several preferred forms of spines adapted for a cylinder barrel and its heads.

In its preferred forms, the invention may include the following principal parts: First, an engine cylinder having a large number of small closely spaced substantially radially disposed elongated heat conducting spines outstanding therefrom and permanently united to the cylinder at their inner ends as by welding or brazing so that they are thermally integral therewith; second, a thin sleeve or jacket of high heat conducting metal surrounding said cylinder and spines and preferably attached as by brazing or otherwise to the outer ends of the spines so that the jacket will be in heat conducting contact therewith; third, chamber members closely surrounding the cylinder at the opposite ends of the jacket, these members being attached circumferentially to the cylinder and jacket and each chamber or enclosure having a side opening for the admission and withdrawal respectively of cooling air to and from the space within the jacket occupied by the spines.

Referring more in detail to the figures of the drawing, there is shown a conventional or standard form of internal combustion engine cylinder 10 to which are secured on its outer surface a plurality of closely and regularly disposed elongated metal spines 11 of relatively small cross section. Preferably these spines are brazed or welded to the cylinder wall 12. As shown in Figs. 6 et. seq. the spines 11 may be of cylindrical or tapered form and solid or hollow for a portion of their length. These spines also preferably are relatively long and, if desired, may be thicker at their cylinder attached ends so that their attachment thereto and heat conducting qualities may be most efficient, in relation to heat transfer from the surface of the spines to the cooling air flowing past them. The surface provided with spines shown in the drawing is cylindrical, but it will be understood that irregularly shaped portions of a cylinder barrel or its head may be provided with spines formed to accommodate themselves to the curvature of the cylinder at different portions thereof.

In Fig. 6 is shown a special bifurcated spine the smaller end being welded or brazed to an external cylindrical surface and the bifurcated or outer end contacting a jacket to increase the spine surface along its length and equalize the air flow area between spines radially in the interest of good heat transfer from the spines to cooling air.

In Fig. 7 is shown a solid tapered spine the smaller end being attached to the cylinder wall and the larger end to a jacket to keep the air flow area between spines equalized along the length of the spines.

In Fig. 8 is shown a form of spine formed to accommodate a portion of a cylinder head where the cylinder wall is concave and has a jacketed portion contacting the enlarged end of the spine. It will be understood also that the spines may be bent lengthwise to accommodate various portions of a cylinder head or other irregular surface and promote good heat transfer.

The spacing of the spines about different portions of the surface to be cooled may vary but as shown in Figs. 4 and 5 preferably may be regularly distributed in rows in line or staggered and separated by distances equal to or slightly different from their diameters as may be best for heat transfer.

In the embodiment of the invention selected for detail description and shown in Figs. 1, 2, and 3 spines of elongated cylindrical form are employed, these spines being spaced preferably uniformly about the cylinder barrel as indicated in these figures.

Surrounding the spines 11 is a cylindrical sleeve or jacket 13, preferably of thin sheet metal such as copper, aluminum, or other metal having good heat transferring properties. This jacket or sleeve contacts the outer ends of the spines 11 and preferably is united thermally thereto as by brazing or welding so that by heat conduction from the spines 11 to the jacket 13 the surface of the jacket may be utilized to transfer heat to the air.

At opposite ends of the sleeve or jacket 13 are closure members 14 and 15 in the form of annular members fitting over the ends of the jacket. These members 14 and 15 closely engage the walls of the cylinder 10 and the jacket 13 and each has a side opening 16 and 17, respectively. The upper or inlet member 14 has its opening 16 facing in the direction of the air stream and the lower or outlet member 15 preferably has its opening 17 facing in the opposite direction. The cross-section areas of the spaces within these members varies so that their areas decrease from their openings to the sides opposite thereto.

The outside peripheries of these chamber members 14 and 15 are, as indicated in Fig. 1, disposed eccentrically relative to the cylinder wall 10. The chamber within each of these closure members is therefore formed so that there is a greater space within the chamber members adjacent their openings and the size of this space decreases symmetrically and gradually toward the side directly opposite the opening. Cooling air entering the opening 16 at one side of the member 14 can, therefore, distribute itself uniformly circumferentially about the cylinder 10. Similarly, the cooling air after traversing the interspine space within the jacket 13, enters the closure member 15 and is exhausted therefrom through the lateral opening 17.

In operation, the jacket 13 surrounding the cylinder 10 forms a duct constraining the cooling fluid to flow in a direction axially of the cylinder within the interspine space after being initially uniformly distributed about the spines circumferentially of the cylinder by the upper closure members 14. The upper member 14 forming the space about the cylinder, admits the cooling fluid to the upper end of this duct within the jacket 13 and the lower member 15 permits the withdrawal of the cooling fluid after the air has passed axially through the space surrounding the cylinder and about the spines while being distributed uniformly circumferentially about the cylinder. By reason of the uniformly decreasing cross sectional area of the spaces within the closure members 14 and 15 transversely of the cylinder the cooling air may more evenly circulate and be distributed more uniformly circumferentially about the cylinder thus equalizing the heat transfer through the cylinder walls circumferentially of the cylinder and eliminating distortion from circular section due to temperature stresses that may be set up within the cylinder walls by uneven circumferential temperatures.

It is to be understood that the invention is not limited to the specific embodiment herein illustrated and described, but may be used in other ways without departure from the spirit of the invention as defined by the following claims.

I claim:

1. A cooling construction for internal combustion engine cylinders comprising in combination, an engine cylinder, spine cooling members thermally integral with the wall thereof and projecting generally radially outward therefrom, a heat conducting jacket surrounding said cylinder and spines, said jacket being thermally united to said spines, and an inlet member having an opening at one side thereof and attached to and surrounding said cylinder and jacket at one end thereof for admitting air to the space within said jacket uniformly distributing said air circumferentially of said cylinder, whereby said cooling air may pass axially through said jacket and about said spines.

2. A cooling construction for internal combustion engine cylinders comprising in combination, an engine cylinder, spine cooling members thermally integral with the wall thereof and projecting generally radially outward therefrom, a heat conducting jacket surrounding said cylinder and spines, said jacket being thermally united to said spines, a laterally extending inlet member for admitting air to the space within said jacket at one end thereof, and a laterally extending outlet member for withdrawing air therefrom at the opposite end thereof, whereby cooling air may pass from said inlet member axially of the cylinder within said jacket and to said outlet member.

3. A cooling construction for internal combustion engine cylinders comprising in combination, an engine cylinder, spine cooling members thermally integral with the wall thereof and projecting generally radially outward therefrom, a heat conducting jacket surrounding said cylinder and spines, said jacket being thermally united to said spines, a laterally extending inlet member for admitting air to the space within said jacket, and a laterally extending outlet member for withdrawing air therefrom, said inlet and outlet members being connected to and surrounding said cylinder and jacket at opposite ends thereof, whereby cooling air may pass from said inlet member axially of the cylinder within said jacket and to said outlet member.

4. In a cooling construction for internal combustion engines, the combination of an engine cylinder, cooling spines projecting from said cylinder, a jacket surrounding said cylinder and spines and forming with said cylinder a duct for directing cooling fluid over said spines in a direction axially of said cylinder, said jacket being thermally united to said spines and fluid distributing members for uniformly distributing said fluid circumferentially of said cylinder having side inlet and outlet connections and surrounding said cylinder and attached respectively to said cylinder and jacket at opposite ends thereof, whereby cooling air may pass from said inlet member axially of the cylinder within said jacket and then to said outlet member.

5. In a cooling construction for internal combustion engines, the combination of an engine cylinder, cooling members in the form of spines extending generally radially outward from said cylinder and distributed generally uniformly about said cylinder, a cylindrical jacket surrounding and enclosing said spines, said jacket being thermally united to said spines, an inlet member for cooling fluid having a side opening and attached at one end of said jacket, said member forming a chamber of decreasing cross-sectional area from its opening circumferentially of said cylinder, and an outlet member at the opposite end of said jacket, whereby said cooling fluid admitted to one end of said jacket will be substantially equally distributed circumferentially around said cylinder and about said spines, and may pass axially through said jacket about said spines and then to said outlet member.

6. In a cooling construction for internal combustion engines, the combination of an engine cylinder, cooling members in the form of spines extending generally radially outward from said cylinder and distributed generally uniformly about said cylinder, a cylindrical jacket surrounding and enclosing said spines, said jacket being thermally united to said spines, an inlet member for cooling fluid having a side opening and attached to said jacket at one end thereof, and an outlet member for the cooling fluid having a side opening and attached to said jacket at its opposite end, said members forming chambers having decreasing cross-sectional areas from their openings circumferentially of said cylinder, whereby said cooling fluid admitted to one end of said jacket will be substantially uniformly distributed circumferentially around said cylinder and about said spines and exhausted therefrom after passing axially through said interfin space within said jacket.

CHARLES E. LUCKE.